(12) United States Patent
Van Horn, III et al.

(10) Patent No.: US 8,350,855 B2
(45) Date of Patent: Jan. 8, 2013

(54) SYSTEMS AND METHODS OF REDUCING ANTI-ALIASING IN A PROCEDURAL TEXTURE

(75) Inventors: Robert Brooks Van Horn, III, Herndon, VA (US); Gregory Turk, Tucker, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1196 days.

(21) Appl. No.: 11/869,068

(22) Filed: Oct. 9, 2007

(65) Prior Publication Data

US 2008/0122836 A1    May 29, 2008

Related U.S. Application Data

(60) Provisional application No. 60/867,480, filed on Nov. 28, 2006.

(51) Int. Cl.
*G06T 15/50* (2011.01)
*G09G 5/00* (2006.01)

(52) U.S. Cl. .................. 345/426; 345/582; 345/611

(58) Field of Classification Search .................. 345/426, 345/582–588, 611–616
See application file for complete search history.

(56) References Cited

U.S. PATENT DOCUMENTS

| | | |
|---|---|---|
| 6,788,304 B1 | 9/2004 | Hart et al. |
| 2005/0088440 A1* | 4/2005 | Sloan et al. .................. 345/426 |
| 2006/0232598 A1* | 10/2006 | Barenbrug et al. ........... 345/582 |

OTHER PUBLICATIONS

Van Horn III; "Procedural Reduction Maps;" College of Computing, Georgia Institute of Technology, Apr. 2006; pp. 1-36.*
Van Horn III; "Procedural Reduction Maps;" College of Computing, Georgia Institute of Technology, May 2007; pp. 1-129. Available at http://etd.gatech.edu/theses/available/etd-01082007-113942/unrestricted/vanhorn_robert_b_200705_phd.pdf.*
Hanrahan, P., et al.; "A Language for Shading and Lighting Calculations;" Computer Graphics, vol. 24, No. 4, Aug. 1990; pp. 289-298.
Hart, J.C., et al.; "Antialiased Parameterized Sold Texturing Simplified for Consumer-Level Hardware Implementation;" Graphics Hardware Workshop, Aug. 1999; pp. 10-1-10-10.
Rushmeier, H., et al.; "Applying Shape from Lighting Variation to Bump Map Capture;" IBM TJ Watson Research Center; pp. 1-10.
Olano, M., et al.; "Automatic Shader Level of Detail;" Graphics Hardware, 2003; pp. 7-14, 129.
Abram, G.D., et al.; "Building Block Shaders;" Computer Graphics, vol. 24, No. 4, Aug. 1990; pp. 283-288.

(Continued)

*Primary Examiner* — Aaron M Richer
(74) *Attorney, Agent, or Firm* — Thomas Horstemeyer, LLP (57) ABSTRACT

The disclosed embodiments provide systems and methods for reducing anti-aliasing in a procedural texture. One method includes creating a procedural reduction map describing the texture as applied to an object, and querying the map for radiance of a pixel in the object. One system includes memory and a processor. The processor is programmed, by the code stored in the memory, to create a procedural reduction map describing the texture as applied to an object, and query the map for radiance of a pixel in the object. One system includes means for creating a procedural reduction map describing the texture as applied to an object, and means for querying the map for radiance of a pixel in the object. The map includes a basis functions and a hierarchy of texels. Each texel includes basis weights and a surface normal distribution. Each basis weight corresponds to one of the basis functions.

14 Claims, 10 Drawing Sheets

OTHER PUBLICATIONS

Cook, R., et al.; "Distributed Ray Tracing;" Computer Graphics, vol. 18, No. 3, Jul. 1984; pp. 137-145.
Heidrich, W., "Efficient Rendering of Anisotropic Surfaces Using Computer Graphics Hardware;" Computer Graphics Group, University of Erlangen; pp. 1-4.
McAllister, D.K., et al.; "Efficient Rendering of Spatial Bi-directional Reflectance Distribution Functions;" The Eurographics Association, 2002; pp. 79-88, 157.
Goldman, D.B.; "Fake Fur Rendering;" Industrial Light and Magic; pp. 1-8.
Zhang, E., et al.; "Feature-Based Surface Parameterization and Texture Mapping;" ACM Transactions on Graphics, vol. 24, No. 1, Jan. 2005; pp. 1-27.
Kautz, J., et al.; "Interactive Rendering with Arbitrary BRDFs using Separable Approximations;" Computer Graphics Laboratory; Department of Computer Science; University of Waterloo; pp. 1-15.
Lawrence, J., et al.; "Inverse Shade Trees for Non-Parametric Material Representation and Editing;" ACM SIGGRAPH Conference Proceedings; pp. 1-11.
Ma, W.C, et al.; "Level-of-Detail Representation of Bidirectional Texture Functions for Real-Time Rendering;" National Taiwan University, National Tsing Hua University; pp. 1-8.
Carr, N.A., et al.; "Meshed Atlases for Real-Time Procedural Solid Texturing;" ACM Transactions on Graphics, vol. 21, No. 2, Apr. 2002; pp. 1-26.
Olano, M., et al.; "Normal Distribution Mapping;" University of North Carolina at Chapel Hill; pp. 1-7.
Malzbender, T., et al.; "Polynomial Texture Maps;" ACM SIGGRAPH, Aug. 2001; pp. 1-11.
Williams, L.; "Pyramidal Parametrics;" Computer Graphics, vol. 17, No. 3, Jul. 1983; pp. 1-11.
Amanatides, J.; "Ray Tracing with Cones;" Department of Computer Science, University of Toronto; pp. 1-5.
Kautz, J., et al.; "Real-Time Bump Map Synthesis;" Max-Planck-Institut fur Informatik, University of British Columbia; pp. 1-6.
Dana, K.J., et al.; "Reflectance and Texture of Real-World Surfaces;" ACM TOGS; pp. 1-34.
Cook, R.L.; "Shade Trees;" Computer Graphics, vol. 18, No. 3, Jul. 1984; pp. 223-231.
Guenter, B., et al.; "Specializing Shaders;" Technical Report, Aug. 1995; pp. 1-9.
Cook, R.L.; "Stochastic Sampling in Computer Graphics;" ACM Transactions on Graphics, vol. 5, No. 1, Jan. 1986; pp. 51-72.
Liu, X., et al.; "Synthesizing Bidirectional Texture Functions for Real-World Surfaces;" Microsoft Research, China, University of Illinois at Urbana-Champaign, State Key Laboratory of CAD&CG, Zhejiang University; pp. 1-10.
Crow, F.C.; "The Aliasing Problem in Computer-Generated Shaded Images;" Communications of the ACM, vol. 20, No. 11, Nov. 1977; pp. 799-805.
Pellacini, F.; "User-Configurable Automatic Shader Simplification;" Association for Computing Machinery, Inc., 2005; pp. 445-452.
Cook, R.L., et al.; "Wavelet Noise;" Association for Computing Machinery, Inc., 2005; pp. 803-811.

* cited by examiner

SYSTEMS AND METHODS OF REDUCING ANTI-ALIASING IN A PROCEDURAL TEXTURE

CROSS REFERENCE TO RELATED APPLICATIONS

This application claims the benefit of the filing date of U.S. 60/867,480, filed on Nov. 28, 2006, which is incorporated by reference herein.

STATEMENT REGARDING FEDERALLY-SPONSORED RESEARCH OR DEVELOPMENT

This invention was made with U.S. Government support under agreement numbers CCR0204355 and DMS0138420, respectively, awarded by the National Science Foundation. The Government has certain rights in this invention.

FIELD OF THE DISCLOSURE

The present disclosure relates to computer graphics, and more specifically, to texture mapping.

BACKGROUND

In many computer graphics applications, such as animated movies and video games, textures are applied to objects to make the object appear more realistic. Textures can be divided into two main categories: image textures, and procedural textures. As its name suggests, an image texture is an image, and rendering an image textured object can be viewed as painting a bitmap onto a portion of a two-dimensional plane. In contrast, procedural textures apply a programmable function to an object. Rendering a procedural texture object can be viewed as placing an object in a three-dimensional procedural texture space, so that the object has the appearance of being from that texture.

Both types of textures suffer from an artifact called aliasing when rendering. Techniques to reduce aliasing (i.e., anti-aliasing techniques) for image textures are well known, but these techniques do not lend themselves to solving the procedural texture anti-aliasing problem. The fundamental assumptions that allow these methods to work in image textures are violated in most interesting procedural textures. For example, the most important assumption in image textures is that given a region of the texture, the average color is known. The atomic unit of an image texture is a pixel, which is a color over a region of area. The atomic unit of a procedural texture is an infinitesimal point which has no area. Thus, the average color over a region is not generally known for procedural textures.

The task of anti-aliasing a procedural texture can be extremely difficult even when done by hand. Often the programmer time to create a procedural texture is less than the time to create the anti-aliasing code for the same texture. A particular kind of aliasing, called minification aliasing, occurs when a textured object is viewed from far enough away that the texture contains frequencies in screen space that are higher than the Nyquist frequency given by the sampling rate of the renderer. Minification aliasing is especially distracting during motion sequences, and this is a major problem for rendering procedural textures. Thus, a need arises to address these and other deficiencies.

SUMMARY

The disclosed embodiments provide systems and methods for reducing anti-aliasing in a procedural texture.

One method, among others, includes creating a procedural reduction map describing the texture as applied to an object, and querying the map for radiance of a pixel in the object. One system includes memory and a processor. The processor is programmed, by the code stored in the memory, to create a procedural reduction map describing the texture as applied to an object, and query the map for radiance of a pixel in the object.

One system, among others, includes means for creating a procedural reduction map describing the texture as applied to an object, and means for querying the map for radiance of a pixel in the object. The map includes a basis functions and a hierarchy of texels. Each texel includes basis weights and a surface normal distribution. Each basis weight corresponds to one of the basis functions.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
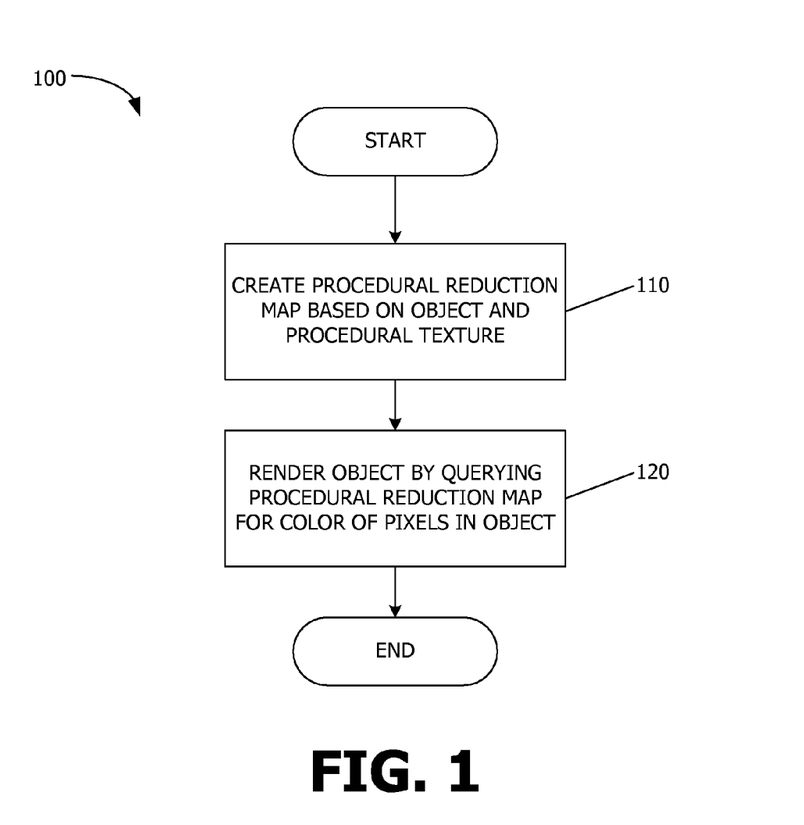
FIG. 1 is a flowchart describing one embodiment of a system and method for reducing aliasing in a procedural texture.

FIG. 1 is a flowchart describing one embodiment of a system and method for reducing aliasing in a procedural texture. The process 100 begins at block 110, where the procedural reduction mapper object creates a procedural reduction map 200 (see FIG. 2) for an input object and an input procedural texture. The input object is given in [u,v] parameterized form. In some embodiments, the size of the procedural reduction map is also specified as an input. In other embodiments, a default size is used. Block 120 executes at a later point in time, when the object is rendered. At block 120, the textured object is rendered by querying the procedural reduction mapper for the radiance of each pixel in the object. Notably, the systems and methods of reducing aliasing in a procedural texture disclosed herein do not require the map to be created in real-time. Instead, map creation can be done off-line, before the object is rendered. The procedural reduction mapper object of FIG. 1 can thus be viewed as a data structure—the procedural reduction map 200 in FIG. 2—as well as associated code for manipulating this data structure—the Create and Render functions of FIG. 1. The data structures and algorithms used by the Create function (block 110) and the Render function (block 120) will now be described in further detail.

Figure 2:
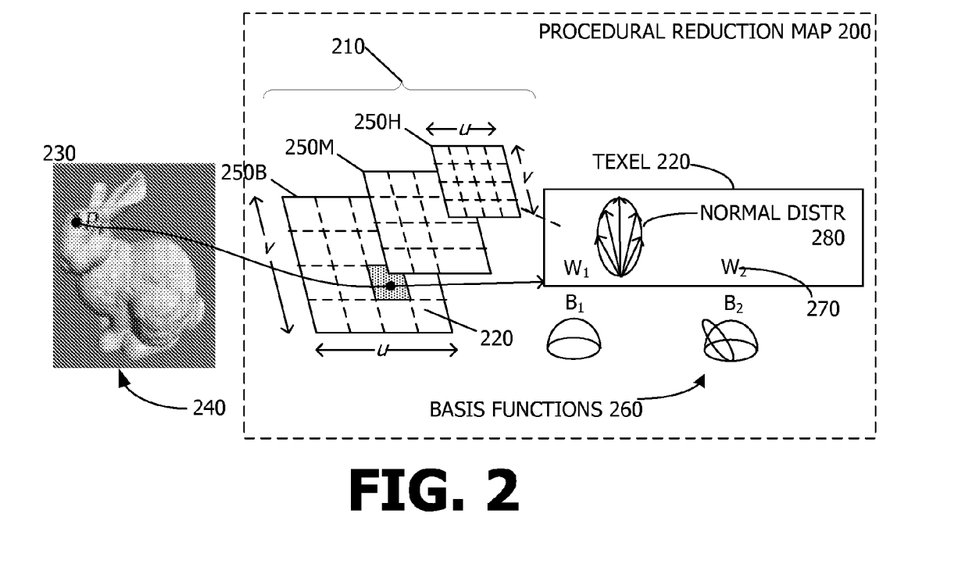
FIG. 2 is a diagram of one embodiment of the procedural reduction map of FIG. 1.

FIG. 2 is a diagram of one embodiment of a procedural reduction map as disclosed herein. A procedural reduction map 200 describes a procedural texture as applied to an object in a way that reduces anti-aliasing, and in particular, minification aliasing. The procedural reduction map 200 comprises a pyramidal hierarchy 210 of texels 220, where each texel 220 corresponds to a two-dimensional area 230 on the surface of the three-dimensional object 240. Texels 220 on a particular pyramid level 250 are arranged in two-dimensional [u,v] space, and the object's surface is also described in [u,v] coordinates. The use of [u,v] coordinates will be understood by a person of ordinary skill in the art. Texels 220 in the base level 250B of the pyramid correspond to the smallest areas of the object 240. Texels 220 at higher levels (e.g., 250M and 250T) correspond to progressively larger areas of the object 240. Thus, texels 220 in the base level 250B represent the finest resolution of the texture.

A person of ordinary skill in the art should be familiar with the concept of reflectance functions, which relate incoming light ($\omega_i$) onto an object to the outgoing light ($\omega_r$). Reflectance functions are used to determine the color seen from a specific point based on the light direction (incoming light $\omega_i$) and the viewing direction (outgoing light $\omega_r$). Such a person should also be familiar with a type of four-dimensional reflectance function known as bidirectional reflectance function distribution (BRDF). The terms "reflectance function" and "BRDF" are used interchangeably herein.

In addition to the texels 220, the procedural reduction map 200 contains a set of basis reflectance functions 260. These basis reflectance functions 260 are a set of reflectance functions that, when linearly combined, describe any of the reflectance functions found on the object's surface. The basis reflectance functions 260 are related to texels 220 as follows. A texel 220 contains a set of basis weights 270, each of which is associated with one of the basis reflectance functions 260. Each basis weight 270 describes the influence that the corresponding basis reflectance function 260 has on that texel. Thus, the weighted sum of the basis reflectance functions 260, using weights 270, represents the procedural texture as applied to the corresponding area 230.

A texel 220 also contains a distribution (280) of surface normals for the corresponding area 230 of the object 240. The surface normal distribution 280 represents the curvature of the object 240 at the corresponding texel 220. (A person of ordinary skill in the art should appreciate that since a distribution of surface normals is used to represent an area on the object.)

Thus, the procedural reduction map 200 as a whole includes reflectance functions for points on the object 240 that can fully reproduce all sampled reflectance functions on the object 240. However, instead of storing all reflectance functions in the procedural reduction map 200, a smaller set of basis reflectance functions 260 is stored with the map 200. Furthermore, instead of storing basis reflectance functions 260 with each texel, each texel instead stores a weight 270 that is associated with one of the basis reflectance functions 260 (with zero weights as needed). In one embodiment, the representation used to store basis reflectance functions 260 is the procedural texture code itself. The storage of procedural reduction map 200 will be described in further detail below.

Figure 3:
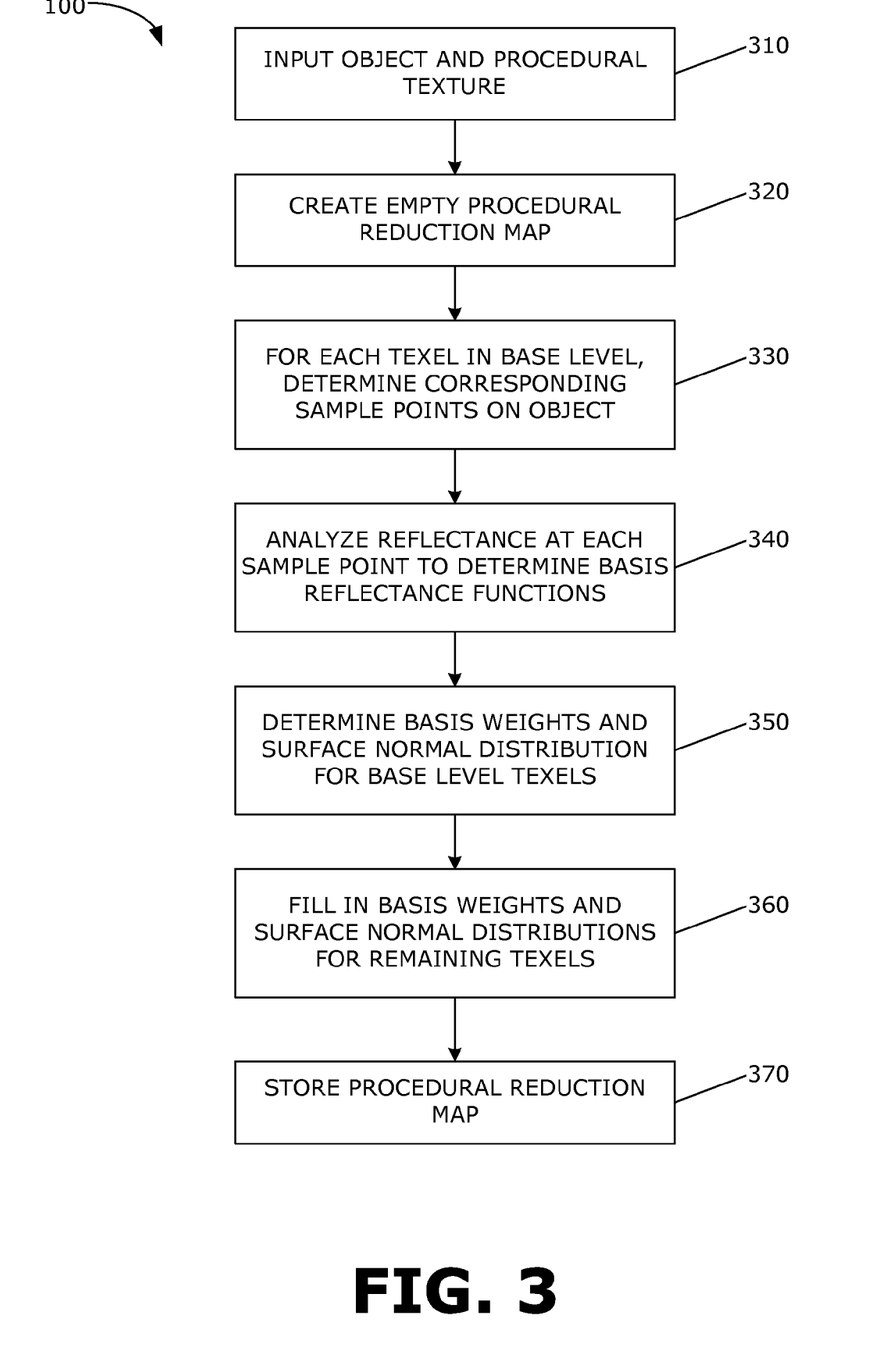
FIG. 3 is a flowchart illustrating further details of the creation of a procedural reduction map as introduced in FIG. 1.

FIG. 3 is a flowchart illustrating further details of the creation of a procedural reduction map (block 110 of FIG. 1). The process 110 begins at block 310, where the object—in [u,v] parameterized form—and the procedural texture are specified. Optionally, the size of the procedural reduction map 200 is also specified. Next, at block 320, an empty procedural reduction map 200 is created, with the number of texels 220 and the number of levels in the pyramid determined based on either the input map size or a default map size.

Processing continues at block 330, which determines, for each texel 220 at the base level 250B of the pyramid, a corresponding set of sample points on the object 240. One embodiment determines this correspondence for regular objects (e.g., spheres, cylinders) using analytic mapping techniques, as known to a person of ordinary skill in the art. Another embodiment determines this correspondence for meshes by parameterizing the object 240 into mesh polygons, then rasterizing each mesh polygon to produce [u,v] samples that correspond to texels 220 at the base level of the pyramid 210. This process as described in more detail in FIG. 4.

Next, at block 340, the reflectance at each of these sample points is analyzed, using multiple viewing and lighting directions, to determine a set of basis reflectance functions 260. Processing continues at block 350, which determines the weights 270 associated with the basis reflectance functions 260 and the surface normal distribution 280, for each texel 220 at the base level. The weights 270 and the surface normal distribution 280 are stored with the texel 220. A person of ordinary skill in the art should understand how these weights 270 can be determined by decomposing a texel 220 into a weighted sum of the basis reflectance functions 260.

Processing continues at block 360, where weights 270 and surface normal distributions 280 in the remaining texels 220 in upper levels of the pyramid are filled in. A person of ordinary skill in the art should understand how these values for a texel 220 at one level can be computed by averaging that texel's children together, in a manner similar to creating a Gaussian pyramid. Finally, at block 370 the procedural reduction map 200 is stored, for example to a file. Notably, although this process 110 involves a number of computations, the cost is amortized by using the resulting procedural reduction map 200 repeatedly when the textured object 240 is rendered multiple times, for example, in an animated sequence.

Figure 4:
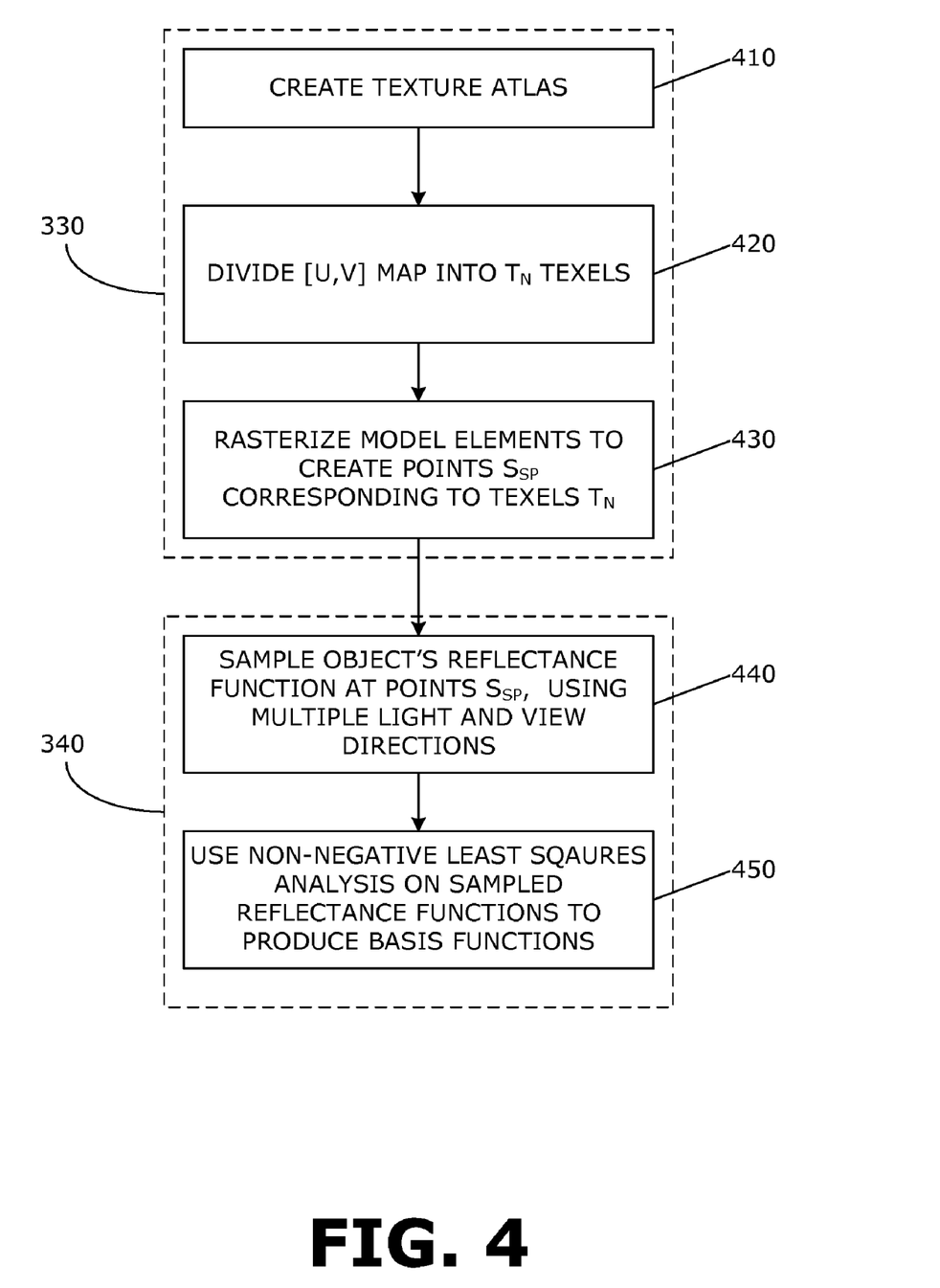
FIG. 4 is a flowchart illustrating further details of several blocks from FIG. 3.

FIG. 4 is a flowchart illustrating further details of the blocks 330 and 340 from FIG. 3, where correspondence between two-dimensional texels 220 and areas 230 on the three-dimensional object 240 is determined. Determining this correspondence for regular objects, such as spheres and cylinders, is done with analytic mapping techniques. These techniques should be known to a person of ordinary skill in the art, and so will not be discussed further. The remaining discussion of FIG. 4 will instead focus on determining the correspondence for irregular items, such as meshes.

The process begins with block 410, where a texture atlas is created for the [u,v] parameterized object. As should be understood by a person of ordinary skill in the art, a texture atlas is amalgamation of one or more texture patches. Each texture patch corresponding to a patch, or region, of the object 240 in [u,v] space. Creating a texture atlas thus can be viewed as creating a [u,v] map, for the object 240. At block 420, the [u,v] map is then broken into $T_N$=D×D texels, where D is the procedural reduction map base dimension size (specified in block 310 of FIG. 3). Each texel 220 relates to an area on the surface of the object 240.

At block 430, the correspondence between two-dimensional texels 220 and areas on the three-dimensional object 240 is determined by rasterizing the model elements, the basic building block of the object 240. A model element varies based on the type of object. For a triangle mesh, the model element is a triangle. For an object made of Bezier patches, it is a Bezier patch. In any case, the [u,v] coordinates of each model element are rasterized to create a set of surface points, $S_{sp}$, that each have [u,v] coordinates, where each set $S_{sp}$ corresponds to a texel $T_N$ in [u,v] space. In one embodiment, the rasterization does not correspond to one sample per texel 220, but is instead supersampled at four times per texel. Such supersampling allows for blending between the procedural reduction map 200 and the original procedural texture when minification no longer occurs. Furthermore, super-sampling $S_{sp}$ allows identification of texels 220 that have more detail and thus require further sampling to get an accurate reconstruction.

The output of block 430 is then a list of texels ($T_1$, $T_2$, ..., $T_N$), each covering a portion of the surface area of object 240, along with a list of corresponding sample points on the object ($S_{sp}$). The systems and methods of reducing aliasing in a procedural texture take advantage of the fact that most procedural textures can be approximated well by a weighted sum of a relatively small number of basis reflectance functions (less than N). The next section of blocks (440 and 450) determine this set of basis reflectance functions 260, $S_B = \{B_1, B_2, ..., B_K\}$, from sampled reflectance functions at each texel $T_N$'S corresponding sample point $S_{sp}$.

The choice to sample reflectance functions is deliberate. Many procedural textures can be written in such a way as to provide the reflectance function at a specific point, which would make basis identification easy. However, it is not necessarily straightforward in all textures to do so. Furthermore, pre-existing textures may not have been written in such a way. Therefore, the systems and methods disclosed herein recognize the basis reflectance functions in an entirely automatic way. To identify these functions, something must be known about the functions themselves. But since this approach is automatic, nothing is known about the functions. Therefore the functions must be sampled.

Figure 5A:
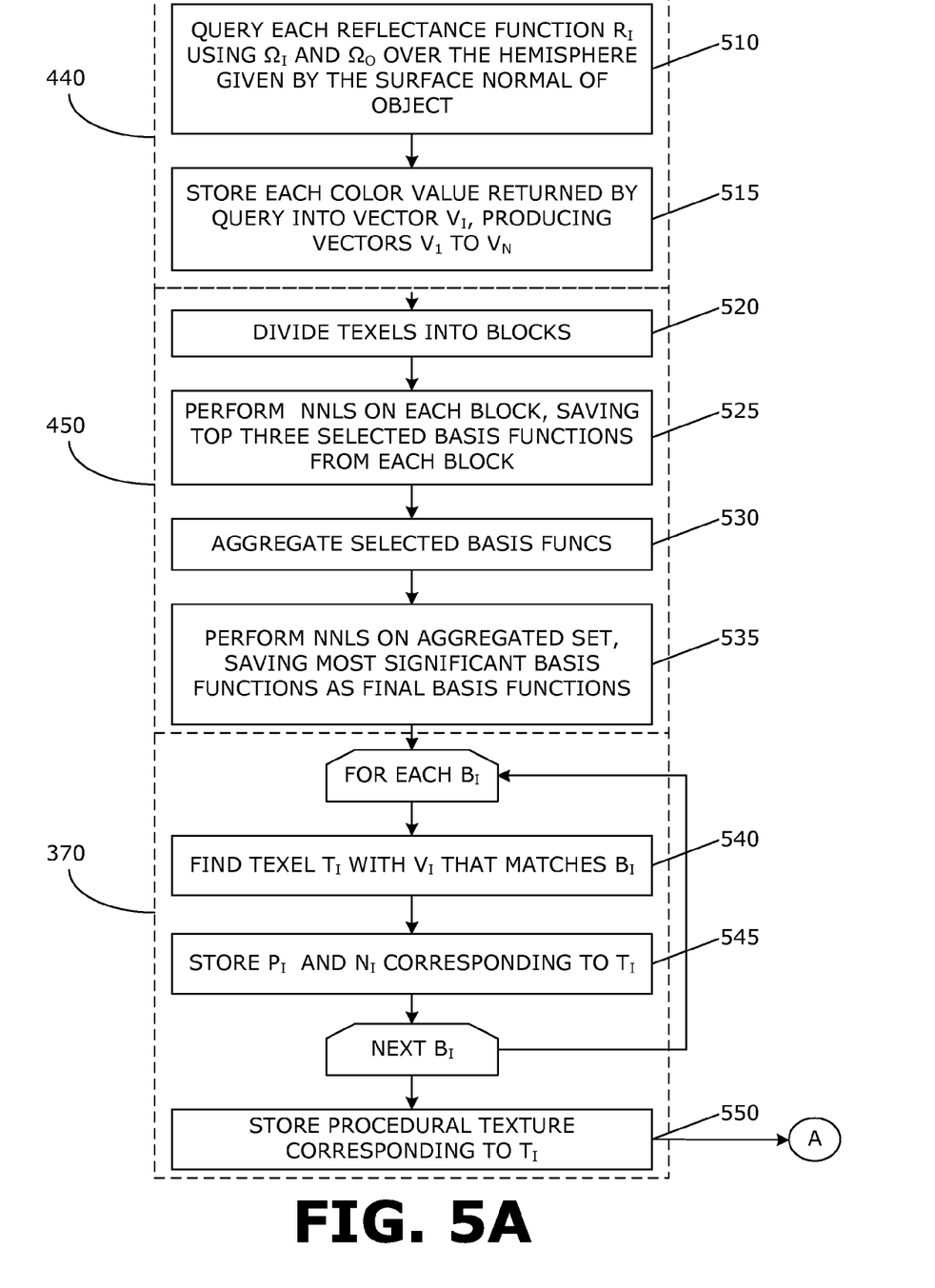
FIGS. 5A and 5B form a flowchart illustrating further details of several blocks from FIG. 3 and FIG. 4.

Block 440 samples the object's reflectance function at points $S_{sp}$, each of which corresponds to a texel 220. The sampling is performed using multiple light and view directions, details of which are described below in connection with FIG. 5. The result of each texel's ($T_i$) sampling is a vector ($V_i$) of the sampling of that texel's reflectance function, so that if two texels have the same reflectance function, they will also have equal vectors.

Processing continues at block 450, where the collection of sampled reflectance function vectors $V_i$ is analyzed using a non-negative least squares (NNLS) matrix factorization solver. The result of the analysis in block 450 is a set of basis reflectance functions 260. The use of basis reflectance functions 260 was described earlier in connection with FIGS. 2 and 3: the basis reflectance functions 260 are stored with the procedural reduction map 200, and are used to calculate basis weights 270 on a per-texel basis.

The choice of non-negative least squares matrix factorization in block 450 is deliberate and inventive. The span of the vectors $V_i$ results in a sub-space of vectors. The number of different possibilities for basis reflectance functions 260 can be infinite, since for interesting (i.e., nonzero) vectors, such a sub-space can be spanned by an infinite number of different vectors. However, the systems and methods of reducing anti-aliasing in a procedural texture recognize that preferences exist for the selection of the basis reflectance functions 260. First, the vectors representing the final basis reflectance functions preferably exist among the input vectors $V_i$. Second, speed and storage concerns advocate a small number of basis reflectance functions. Finally, the basis vectors are preferably as orthogonal as possible to avoid numerical inaccuracy problems during processing. Notably, the systems and methods of reducing anti-aliasing in a procedural texture recognize that non-negative least squares matrix factorization solves the problem under these constraints.

Figure 5B:
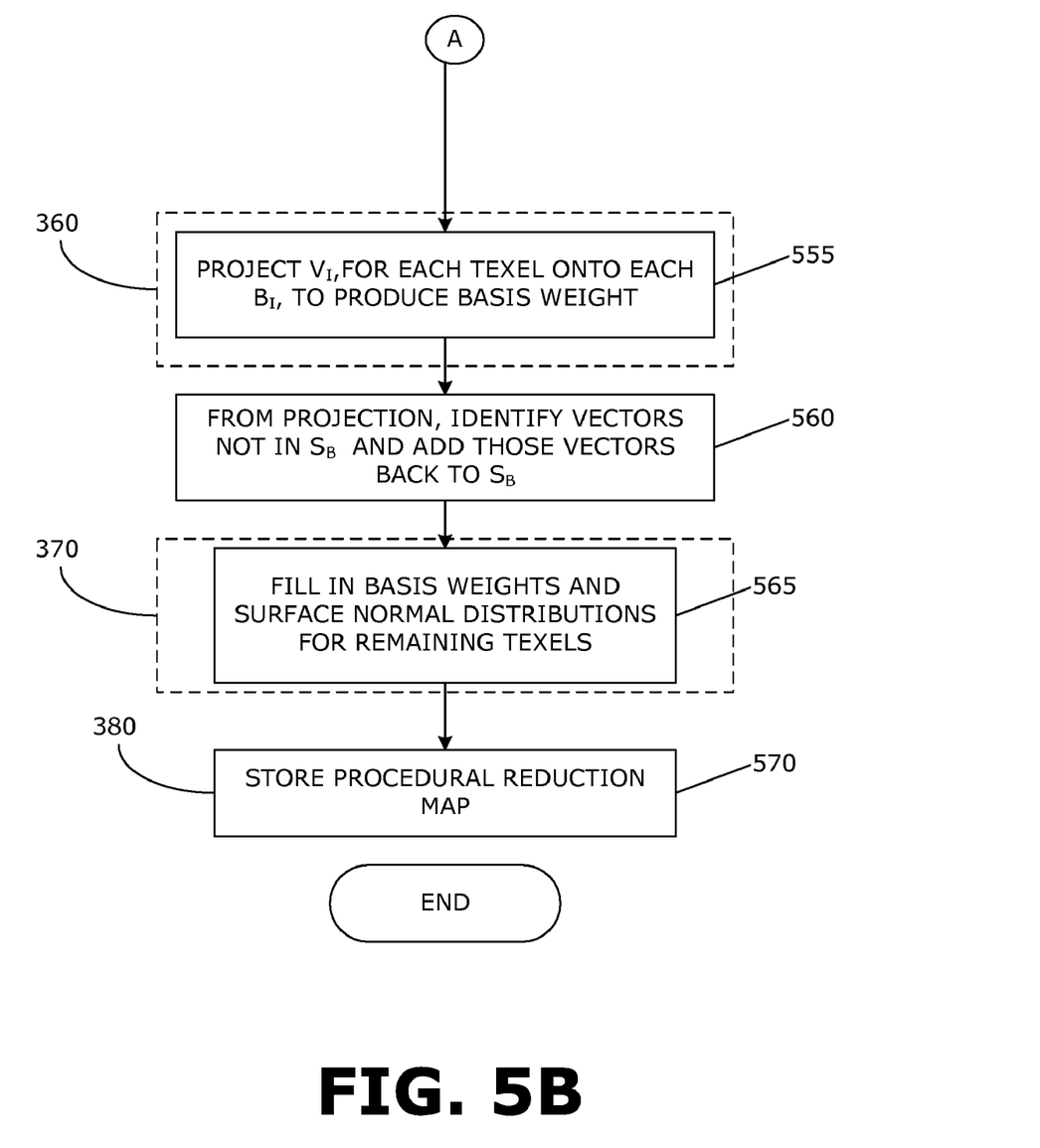

The reflectance function sampling block (440), the reflectance function analysis block (450), and the map storage block (370) will now described in further detail in connection with the flowchart of FIGS. 5A and 5B. The notation $R(\omega_i, \omega_r)$ will be used to describe a single BRDF, where $\omega_i$, and $\omega_r$ are the incoming and reflected light directions, respectively. Each texel $T_i$ corresponds to some reflectance function $R_i$, expressed by the input procedural texture.

The process starts at block 510, where each reflectance function $R_i$ is queried using multiple incoming and reflected directions $\omega_i$, and $\omega_r$ over the hemisphere given by the surface normal of object 240. The same set of incoming directions $\omega_i$, and outgoing directions $\omega_r$ are used when querying each reflectance function $R_i$. Each query of block 510 (each $\omega_i$, and $\omega_r$ for each $R_i$) returns a radiance value, and block 515 places each of these radiance values into the corresponding vector $V_i$. Thus, $V_i$ gives the sampled representation for the reflectance function $R_i$. Since there are N texels $T_i$, block 515 produces N sampled reflectance functions $V_1$ to $V_N$.

The incoming directions $\omega_i$, and outgoing directions $\omega_r$ used in one embodiment are shown in Table 1. Although it is possible to use any number of BRDF samples, a balance can be struck between using few samples for speed and using many samples to accurately represent a given BRDF, and the selection of sampled directions in Table 1 reflects such a balance.

TABLE 1

| Outgoing Elevation $\Theta i$ | Incoming elevation $\Theta o$ | Rotation Difference $\phi$ |
|---|---|---|
| 0 | 0 | 0 |
| 0 | 2 | 0 |
| 0 | 2 | 90 |
| 0 | 10 | 0 |
| 0 | 10 | 90 |
| 0 | 15 | 0 |
| 30, 45, 60, 85 | $\Theta_i$ | 180 |
| 30, 45, 60, 85 | $\Theta_i$ | 180 + 2 |
| 30, 45, 60, 85 | $\Theta_i$ | 180 + 10 |
| 30, 45, 60, 85 | $\Theta_i + 2$ | 180 |
| 30, 45, 60, 85 | $\Theta_i + 10$ | 180 |
| 30, 45, 60, 85 | 15 | 180 |
| 30, 45, 60, 85 | 75 | 180 |
| 180 | 0 | 0 |

As described above, NNLS is used to determine a set of basis reflectance functions from a set of sampled reflectance function vectors $V_i$. A multi-step analysis is used to reduce the computational requirements of NNLS for relatively large numbers of input vectors. Each level of the pyramid is a grid of N×N texels. At block 520, the entire grid (one level) is divided into blocks. Next, at block 525, NNLS is performed on each of these blocks, and the top three selected basis BRDFs from each block are saved. Processing continues at block 530, where the selected BRDFs are aggregated. Finally, at block 535, NNLS is performed on the aggregation. The most significant BRDFs from this factorization become the final set of basis reflectance functions $S_B$, containing k basis BRDFs $\{B_1, B_2, \ldots, B_K\}$. In one embodiment, a grid is 1024×1024 texels, and a factorization block is 32×32 texels.

Having selected the basis reflectance functions 260 in blocks 510-535, the functions are stored in the procedural reduction map 200 as follows. For each basis function $B_I$, block 540 finds the texel $T_I$ whose sampled reflectance function $V_I$ is closest to the basis function $B_I$. Block 545 stores, in the procedural reduction map 200, the position $P_i$ on the object's surface which corresponds to that matching texel $T_I$, as well as the surface normal $n_i$ at this point $P_i$. Block 550 stores the input procedural texture (i.e., the code) in the procedural reduction map 200. The combination of position $P_i$, surface normal $n_i$, and the input procedural texture is the basis BRDF.

Although a person of ordinary skill in the art should understand there are many ways to actually store the texel data, one exemplary data structure is:

```
struct texel {
    unsigned char weights[k];      // Basis weights
    float         theta, phi;      // direction of average normal
    unsigned char length;          // length of normal (NDM)
    float         covariance[6];   // covariance matrix (NDM)
};
```

All data members marked as NDM (Normal Distribution Map) can be removed if the object is deemed smooth enough relative to the reflectance functions. This is generally true for functions that contain little or no specular components. Each texel has a memory cost of k+8 bytes, where k is the number of basis reflectance functions in the procedural reduction map) when no normal distribution is needed. When the normal distribution map is necessary, the memory cost becomes k+33 bytes.

Having stored the basis reflectance functions 260, processing continues at block 555 (see FIG. 5B), where each texel's sampled reflectance function, $V_I$, is projected onto each basis reflectance function $B_I$. The projection scalings are the corresponding weights (270 in FIG. 2) for each basis reflectance function, stored at each texel. Block 560 uses this projection of the vectors into that subspace to identify vectors that are not in the subspace defined by SB. Finally, block 565 adds back to the set $S_B$ any of these identified reflectance functions. (Note that these added-back functions are the same ones that may have been discarded during step 540.)

The processing in blocks 510 to 560 fills in the texels (with corresponding surface area) at the lowest level of the pyramid. Block 565 (corresponding to block 370 in FIG. 3) fills the remaining texels. Finally, block 575 (corresponding to block 380 of FIG. 3) stores the procedural reduction map 200

A person of ordinary skill in the art should appreciate that, just as with MIP-Maps, higher levels of the pyramid provide a good, fast approximation to the reflectance function for progressively larger areas of the surface. Similar to MIP-Maps and other Gaussian pyramids, each progressively higher-level texel is determined by a weighted average of child texels. The procedure repeats until all levels of the procedural reduction map hierarchy are filled in.

As noted previously, some portions of a texture atlas can be empty, that is, may not correspond to any portion of an object. A person of ordinary skill in the art should be familiar with the use of the push-pull pyramid algorithm to insure that empty texels do not contribute to texel values at higher pyramid levels, by bleeding the information into the empty texels. Although originally applied to color information, the push-pull algorithm is adapted in a straightforward manner to apply to basis weights and surface normal distributions instead.

Figure 6:
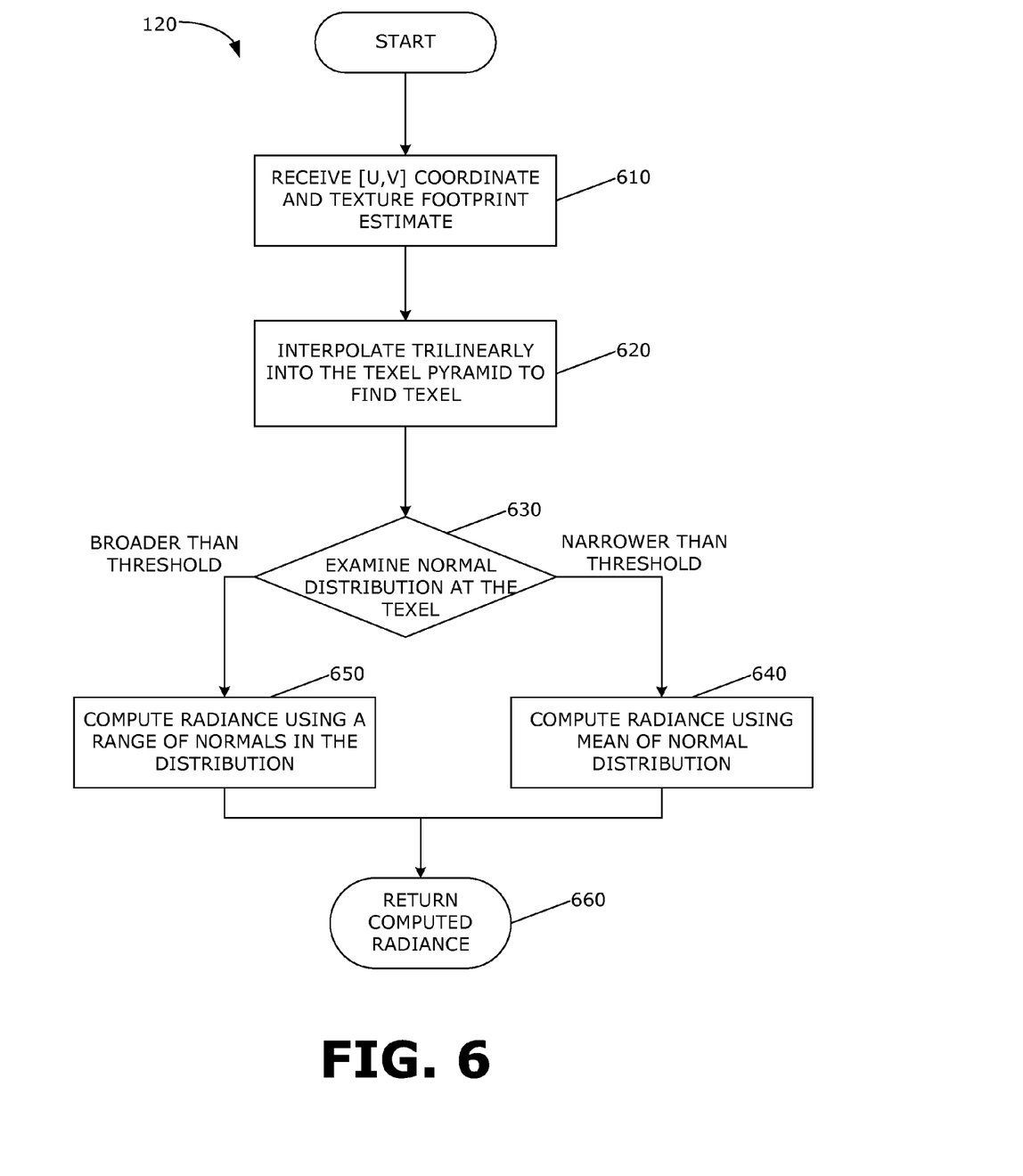
FIG. 6 is a flowchart illustrating further details of the rendering process of FIG. 1.

FIGS. 2-5 discussed the details of creating the procedural reduction map 200. FIG. 6 is a flowchart of the rendering process, which was introduced as block 120 in FIG. 1. The rendering process starts with block 610, where the procedural reduction mapper object is invoked by a renderer. The renderer provides the [u,v] coordinate of the pixel to be rendered and the texture footprint (the portion of the texture visible in the current pixel). At block 620, the procedural mapper object uses trilinear interpolation on the [u,v] coordinate to find the appropriate texel in the pyramid (stored in the procedural reduction map 200). The texture footprint input provides an estimate of how high in the pyramid the mapper should go to retrieve information from the texels. That is, a linear interpolation from $a_i$ to 1 (for the texel at the top of the pyramid) determines the appropriate level within the pyramid. This height is combined with the bilinear (u, v) interpolation to choose a texel from the grid at that level, producing the final texel location within the pyramid. That texel stores a set of basis weights 270 and a surface normal distribution 280. The remaining blocks in the rendering process 120 (blocks 630-650) compute the final radiance from basis weights 270 and a surface normal distribution 280.

At block 630, the mapper object examines the surface normal distribution 280. If the distribution is narrower than a predefined threshold, then processing continues at block 640, which computes radiance from the mean of the distribution (a method referred to herein as "single normal computation"). On the other hand, if the distribution of normals is broader than a predefined threshold, the processing continues at block 650, which computes radiance from a range of normals in the distribution (a method referred to herein as "broad distribution computation"). In either case, the computed radiance, from block 640 or block 650, is returned to the renderer at block 660. In one embodiment, block 630 determines a broad distribution is present by sampling the normal distribution along those eigenvectors whose eigenvalues are the largest in the distribution. The choice of a threshold can be empirically determined.

Figure 7:
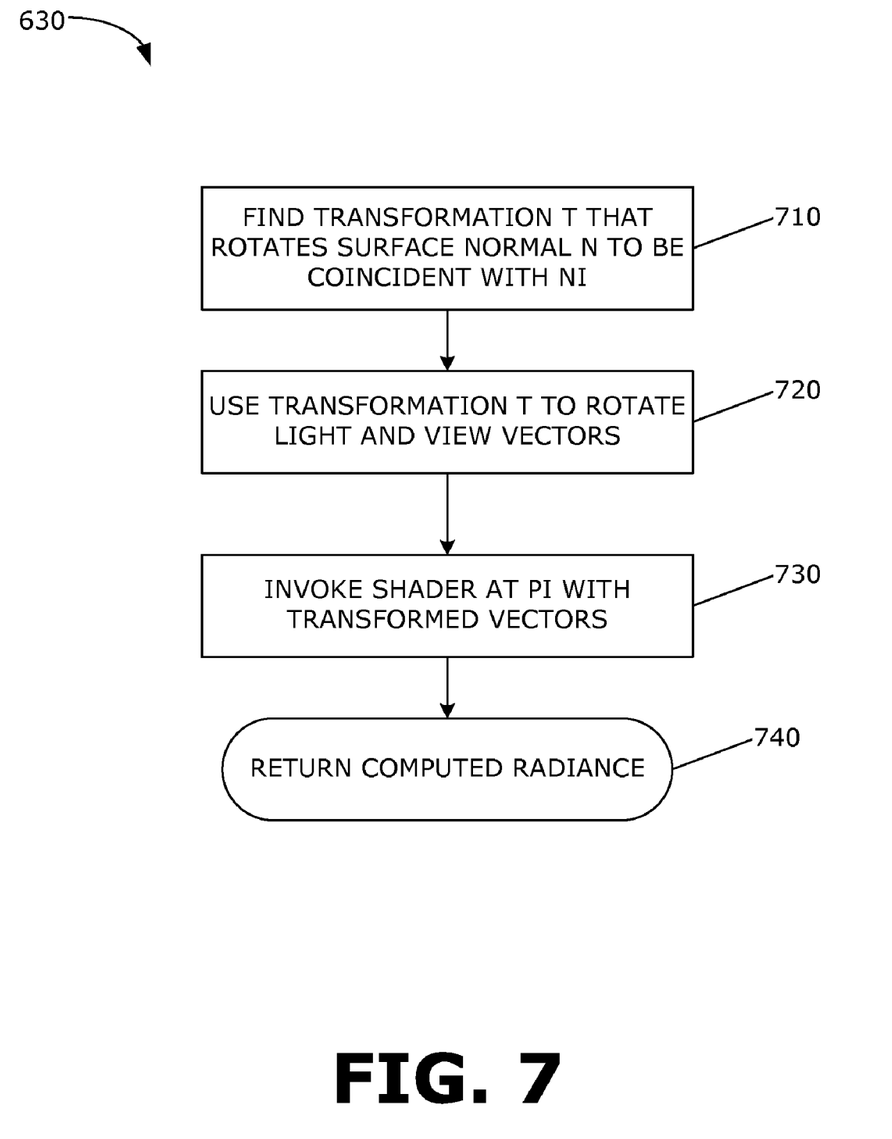
FIG. 7 is a flowchart illustrating further details of the single normal computation block of FIG. 6.

FIG. 7 is a flowchart of the single normal computation block 640 of FIG. 6. This process computes radiance by evaluating the basis reflectance functions at the texel provided by the interpolation (block 620), scaling each of the functions by the weight at the texel. As described earlier, each basis reflectance function is represented as a normal $n_i$ and a position $P_i$ on the object having the appropriate reflectance function $R_i$ associated with it. At block 710, the mapper finds that transformation T which rotates n—the normal provided by interpolation, which is also the mean of the normal distribution—to be coincident with $n_i$. Next, at block 720, the mapper uses the transformation T to rotate the light and the view vector into the appropriate coordinate system. (A person of ordinary skill in the art should understand how the appropriate transformation is found and then applied.) Finally, block 730 invokes the procedural texture at the location $P_i$ with these transformed light 650 and view vectors. (As explained earlier, the procedural texture code is stored with the basis function.) The value returned by procedural texture code is the outgoing radiance, which is returned to the caller (i.e., the renderer), at block 740.

Figure 8:
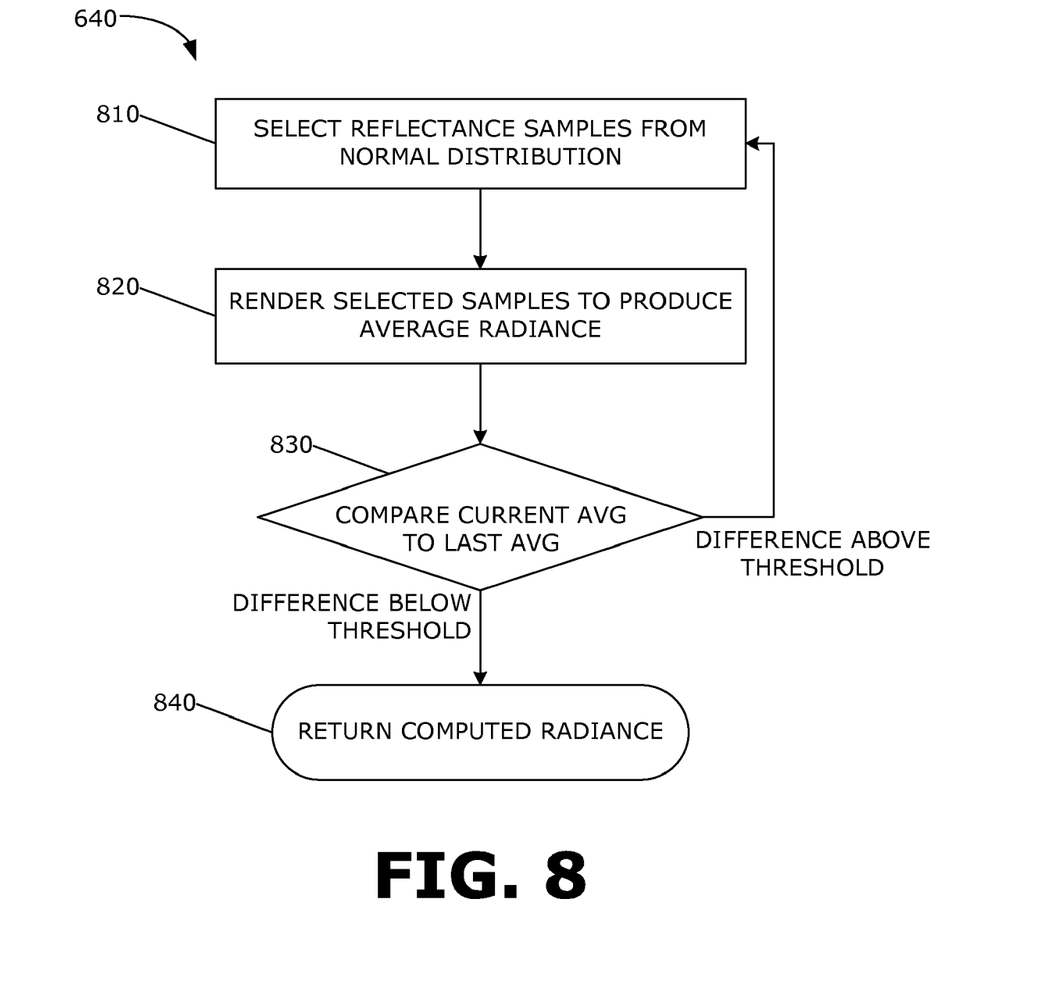
FIG. 8 is a flowchart illustrating further details of the broad distribution computation block of FIG. 6.

FIG. 8 is a flowchart of the broad distribution computation block 650 of FIG. 6. This process computes radiance, but instead of evaluating the basis reflectance functions for the mean of the surface normal (as in FIG. 7), an integral of the reflectance function for a range of surface normals is used. At block 810, a predefined number of reflectance samples are randomly selected from the surface normal distribution. In one embodiment, the predefined number of samples is relatively small, such as 10. Next, at block 820, each of the selected samples is rendered, producing an average radiance. The rendering was described earlier in connection with blocks 710-730 of FIG. 7. The process continues at block 830, which compares the average radiance produced by the previous iteration to the average radiance produced by the current iteration. If the difference is less than a threshold (i.e., radiances are similar enough), then the process is complete and the current average radiance is returned by the caller (i.e., the renderer) at block 840. If the difference is greater than a threshold, then the next iteration repeats, starting at block 810.

Now that the systems and methods of reducing anti-aliasing in a procedural texture have been described, several variations and enhancements will be described. One such enhancement is super-sampling, or auto-detail resolution. The sampling of a texel's reflectance function described in connection in block 440 above assumes that the reflectance function is constant over the corresponding area of the object. One variation of the systems and methods described herein performs super-sampling of objects areas, which detects such differences in the reflectance function over the area. If detected, this variation further super-samples the texel accordingly, until either the maximum number of super-samples is reached, or the average sampled reflectance function does not change with further sampling. One embodiment uses a maximum of sixteen super-samples, which is enough to handle an edge case. Once the average reflectance function is found, the average is used as that texel's reflectance function.

Another enhancement relates to determining the surface normal (block 575). The sampling of the reflectance function during analysis requires the surface normal so that the appropriate incoming and outgoing light directions can be used. For many procedural textures, the geometric normal, that is, the normal of the object at that point, is the surface normal used by the procedural texture. However, some procedural textures perturb the normals during shading calculations (e.g., those that have bump maps or normal maps). To handle these kinds of textures, the system preferably automatically estimates the perturbed normals by sampling the reflectance function. The new normal after being perturbed by the procedural texture is often called the shader normal. However, for ease of discussion, this term is extended herein to include the geometric normal even when the procedural texture has no bump mapping.

When the shader normal differs from the geometric normal, sampling of the reflectance functions is more complex. If transformation of the incoming and outgoing light directions is not applied based on the normal that the texture will use in its calculation, then using the geometric normal will result in equivalent reflectance functions not being recognized as such. The result will be duplicate reflectance functions, which is undesirable. Therefore, some embodiments of the systems and methods of reducing anti-aliasing in a procedural texture disclosed herein automatically determine the shader normal, using a heuristic function, in order to fulfill the goal of minimizing the number of basis reflectance functions. Such embodiments will be referred to as "shader normal embodiments."

Figure 9:
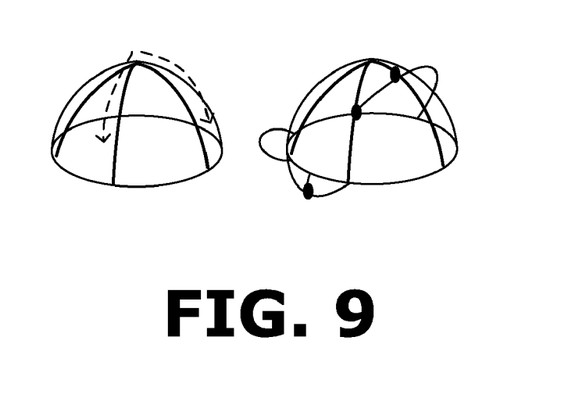
FIG. 9 is a diagram illustrating how arcs and great arcs are used to determine a shader normal for a (u, v) coordinate.

Starting from the geometric normal and heading toward the opposite point on the sphere, the algorithm used by the shader-normal embodiments adaptively samples the reflectance function along two distinct great arcs, or two non-collinear lines from the geometric normal toward the opposite pole. The purpose is to find where the reflectance function is black, indicating that the light is below the surface corresponding to the normal. As shown in FIG. 9, the points of which the two arcs first reach the color black creates a plane (along with the center of the sphere) that defines the shader normal. One embodiment uses fifteen samples per line (thirty total) using a binary search (results are either black or not), giving an estimate of the shader normal that is within $10^{-4}$ radians of the original answer. In order to sample the reflectance function along the great arcs, the incoming and outgoing light directions must be set. As shown in FIG. 6, a sample point on the great arc specifies the direction for both the incoming and outgoing light directions. At this point, the shader normal for a specific (u, v) coordinate has been determined.

Once the corresponding surface normal for a texture has been determined, that surface normal is stored at the texel's location in the base of the pyramid. When creating the higher levels of the pyramid, surface normal information is aggregated into a normal distribution map. The distribution is described as a mean normal vector (a 3D vector) and a 3×3 symmetric covariance matrix which approximates the distribution of surface normals on a sphere. Using a normal distribution representation means that aggregation of lower pyramid levels into a higher level can be accomplished by linearly combining the normal distributions, to form a single, broader distribution.

Another enhancement relates to use of the procedural reduction map 200 by the renderer. While the embodiments described above use the procedural reduction map 200 unconditionally, this enhancement uses the procedural reduction map 200 conditionally, depending on the size of the texture footprint. Conditional use of the procedural reduction map 200 by the renderer will now be discussed in connection with the renderer flowchart of FIG. 10.

Figure 10:
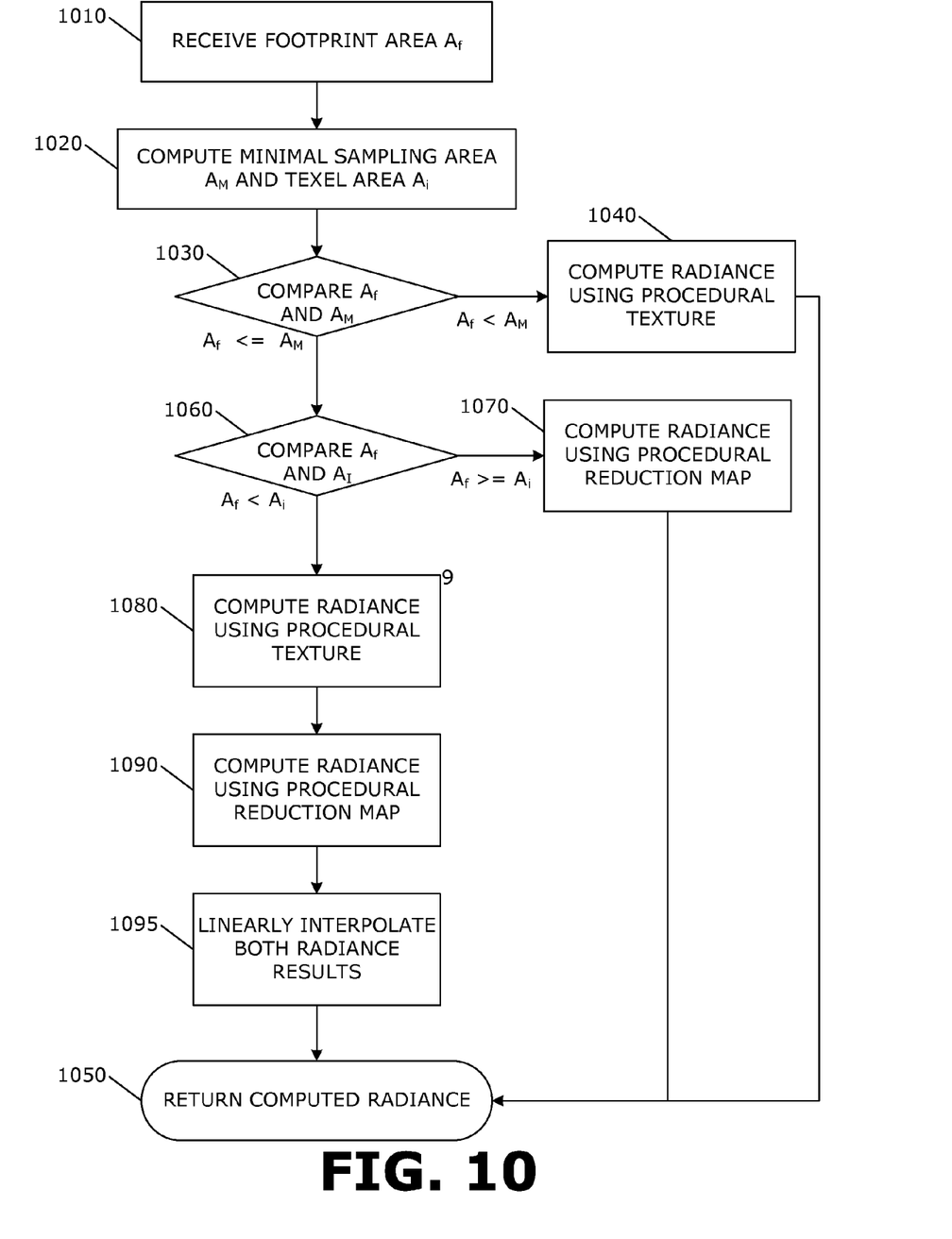
FIG. 10 is a flowchart illustrating further details of the rendering process of FIG. 1.

The process starts at block 1010, where the renderer is provided with the texture footprint, Next, at block 1020, a base-level texel area $a_t$ and a minimal sampling area $a_m$ are computed for the texel being rendered. The computations are given by the equations $$a_t = \frac{1}{d^2}; \quad a_m = \frac{a_t}{m_s}$$

where d is the resolution of the pyramid's base level, and $m_s$ is the maximum supersampling of any given texel.

Next, block 1030 compares this minimal sampling area $a_m$ to the texture footprint $a_f$ (provided as input to the renderer). If the texture footprint $a_f$ is less than the minimal sampling area $a_m$, then processing continues at block 1040, where the renderer uses the original procedural texture, without anti-aliasing from the procedural reduction map 200, to compute radiance. The computed radiance is returned at block 1050. However, if the texture footprint $a_f$ is not less than the minimal sampling area $a_m$, then processing continues instead at block 1060, where the texture footprint $a_f$ is compared to the base-level texel area $a_t$. If the texture footprint $a_f$ is less than or equal to the base-level texel area $a_t$, then processing continues at block 1070, where the renderer uses the procedural reduction map 200 to compute radiance. The computed radiance is returned at block 1050. If the texture footprint $a_f$ is instead greater than the base-level texel area $a_t$, then the radiance is computed using both the original procedural texture (block 1080) and the procedural reduction map 200 (block 1090), and the two results are linearly interpolated (block 1095). The computed radiance is returned at block 1050.

Figure 11:
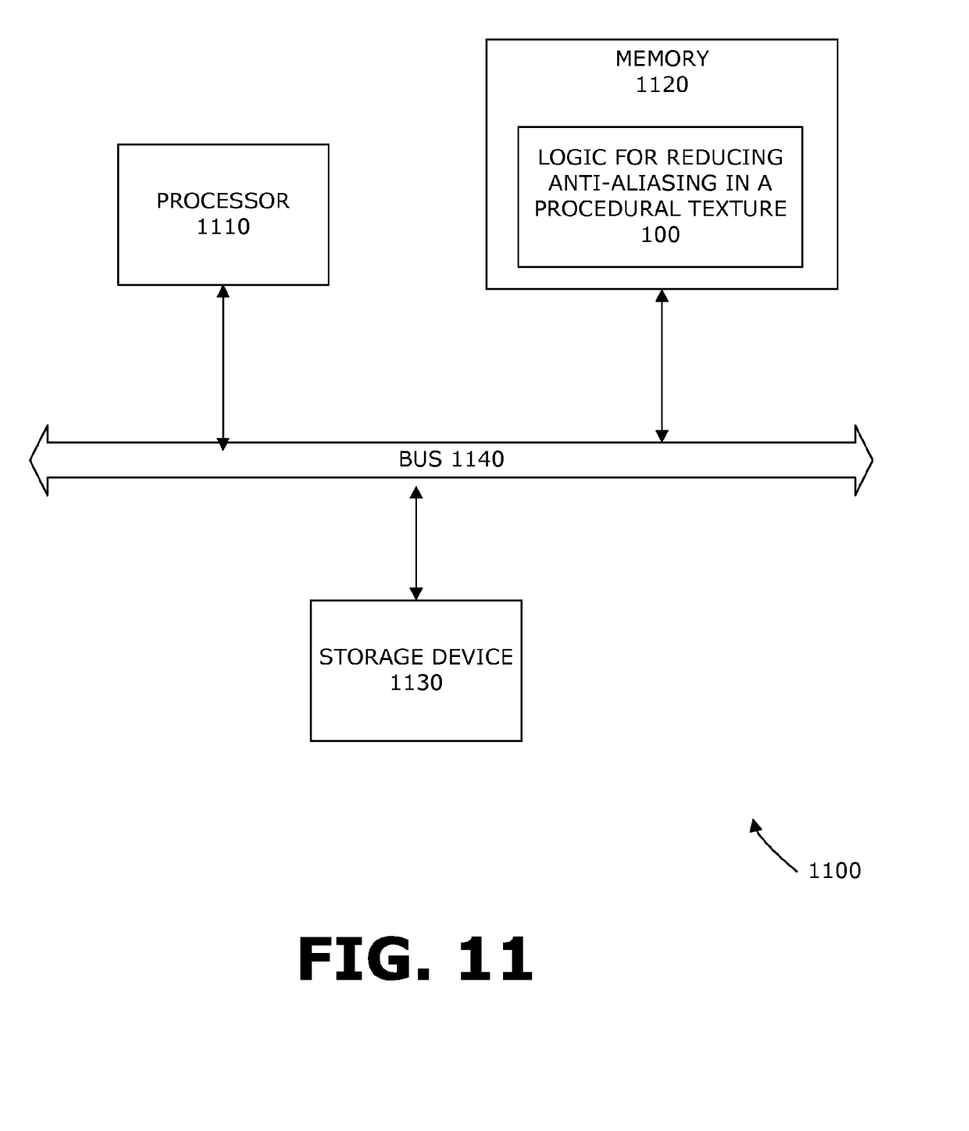
FIG. 11 is a hardware block diagram of a general-purpose computer which can be used to implement various embodiments of systems and methods for anti-aliasing a procedural texture.

FIG. 11 is a hardware block diagram of a general-purpose computer 1100 which can be used to implement various embodiments of systems and methods for anti-aliasing a procedural texture. Computer 1100 contains a number of components that are well known in the computer arts, including a processor 1110, memory 1120, and storage device 1130. Examples of storage device 1130 include, for example, a hard disk, flash RAM, flash ROM, and EEPROM. These components are coupled via a bus 1140. Memory 1120 contains instructions which, when executed by the processor 1110, implement systems and methods of reducing anti-aliasing in a procedural texture, such as the processes depicted in the diagrams of FIGS. 1-10. Omitted from FIG. 11 are a number of conventional components that are unnecessary to explain the operation of computer 1100.

The systems and methods of reducing anti-aliasing in a procedural texture, such as method 100 and system 1100, can be implemented in software, hardware, or a combination thereof. In some embodiments, the device, system, and/or method is implemented in software that is stored in a memory and that is executed by a suitable microprocessor, network processor, or microcontroller situated in a computing device. In other embodiments, the device, system and/or method is implemented in hardware, including, but not limited to, a programmable logic device (PLD), programmable gate array (PGA), field programmable gate array (FPGA), an application-specific integrated circuit (ASIC), a system on chip (SoC), and a system in package (SiP).

The systems and methods of reducing anti-aliasing in a procedural texture, such as method 100 and system 1100, can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The software components illustrated in FIGS. 1-10 are abstractions chosen to illustrate how functionality is partitioned among components in some embodiments of a system and method for anti-aliasing a procedural texture. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead. As just one example, a particular implementation might use a linked list instead of an array.

The software components illustrated in FIGS. 1-10 are described in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

The software components illustrated in FIGS. 1-10 include executable code that is packaged, for example, as a standalone executable file, a library, a shared library, a loadable module, a driver, or an assembly, as well as interpreted code that is packaged, for example, as a class. In general, the components used by the systems and methods for anti-aliasing a procedural texture are described herein in terms of code and data, rather than with reference to a particular hardware device executing that code. Furthermore, the systems and methods can be implemented in any programming language, and executed on any hardware platform.

Process descriptions or blocks in flowcharts represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A computer-implemented method for anti-aliasing a procedural texture comprising the steps of:
   creating, by a computer, a procedural reduction map describing the procedural texture as applied to an object;
   receiving a texture coordinate centered on a pixel;
   receiving a texture footprint for the pixel;
   interpolating the texture coordinate to find a corresponding texel in a hierarchy of texels of the procedural reduction map;
   computing a radiance of the pixel based at least in part on a mean of a surface normal distribution of the corresponding texel if the surface normal distribution of the corresponding texel is narrower than a threshold; and
   computing the radiance of the pixel based at least in part on a range of normals in the surface normal distribution of the corresponding texel if the surface normal distribution of the corresponding texel is broader than the threshold.

2. The method of claim 1, wherein the procedural reduction map includes a plurality of basis functions and the hierarchy of texels, and each texel includes a plurality of basis weights and a surface normal distribution, and each of the basis weights corresponds to one of the basis functions.

3. The method of claim 2, wherein the creating step further comprises the steps of:
- analyzing reflectance at each of a plurality of sample points on the object to produce the plurality of basis functions of the procedural reduction map; and
- determining the plurality of basis weights and the surface normal distribution for each of the texels in the hierarchy of the procedural reduction map.

4. The method of claim 2, wherein the creating step further comprises the steps of:
- analyzing reflectance at each of a plurality of sample points on the object to produce the plurality of basis functions of the procedural reduction map;
- determining the plurality of basis weights and the surface normal distribution for each of a portion of the texels on a base level of the hierarchy; and
- aggregating the basis weights and the surface normal distribution of the texels on the base level of the hierarchy to produce the basis weights and the surface normal distribution of the texels on the remaining levels of the hierarchy.

5. A system for anti-aliasing a procedural texture comprising:
- memory having stored thereon program code; and
- a processor that is programmed by at least the program code to:
  - create a procedural reduction map describing the procedural texture as applied to an object, the procedural reduction map comprising a plurality of basis functions and a hierarchy of texels, and each texel comprising a plurality of basis weights and a surface normal distribution, and each of the basis weights corresponding to one of the basis functions;
  - find a matching texel $T_I$, with a sample reflectance function that is in closest proximity to one of the plurality of basis functions $B_I$;
  - determine a point $P_i$ on the object corresponding to the matching texel;
  - determine a surface normal $n_i$ at the point $P_i$; and
  - store the procedural texture the surface normal $n_i$, and the point $P_i$, as the basis function $B_I$.

6. The system of claim 5, wherein the processor is further programmed by at least the program code to:
- analyze reflectance at each of a plurality of sample points on the object to produce the plurality of basis functions of the procedural reduction map; and
- determine the plurality of basis weights and the surface normal distribution for each of the texels in the hierarchy of the procedural reduction map.

7. The system of claim 5, wherein the processor is further programmed by at least the program code to:
- analyze reflectance at each of a plurality of sample points on the object to produce the plurality of basis functions of the procedural reduction map;
- determine the plurality of basis weights and the surface normal distribution for each of a portion of the texels on a base level of the hierarchy; and
- aggregate the basis weights and the surface normal distribution of the texels on the base level of the hierarchy to produce the basis weights and the surface normal distribution of the texels on the remaining levels of the hierarchy.

8. The system of claim 5, wherein the processor is further programmed by at least the program code to:
- receive a texture coordinate centered on the pixel;
- receive a texture footprint for the pixel;
- interpolate the texture coordinate to find a corresponding texel in the hierarchy of the procedural reduction map; and
- compute the radiance of the pixel based on the surface normal distribution of the corresponding texel.

9. The system of claim 8, wherein the processor is further programmed by at least the program code to:
- compute the radiance of the pixel based on the mean of the surface normal distribution of the corresponding texel if the surface normal distribution of the corresponding texel is narrower than a threshold; and
- compute the radiance of the pixel based on a range of normals in the surface normal distribution of the corresponding texel if the surface normal distribution of the corresponding texel is broader than the threshold.

10. The system of claim 8, wherein the processor is further programmed by at least the program code to:
- select a plurality of reflectance samples from the surface normal distribution of the corresponding texel;
- render each of the selected samples to produce an average radiance;
- repeat the selecting and rendering until the difference in average radiance is less than a predefined threshold.

11. The system of claim 5, wherein the processor is further programmed by at least the program code to:
- receive a texture coordinate centered on the pixel and a texture footprint $A_f$ for texel associated with the pixel;
- compute a minimal sampling area $A_M$ for the texel associated with the pixel;
- compute a base-level texel area $A_i$ for the texel associated with the pixel;
- if the texture footprint $A_f$ is less than the minimal sampling area $A_M$, compute the radiance of the pixel based on the procedural texture;
- if the texture footprint $A_f$ is greater than or equal to the minimal sampling area $A_M$ and the texture footprint $A_f$ is greater than or equal to the base-level texel area $A_i$, compute the radiance of the pixel based on the procedural reduction map; and
- if the texture footprint $A_f$ is greater than or equal to the minimal sampling area $A_M$ and the texture footprint $A_f$ is less than the base-level texel area $A_i$, compute a first radiance of the pixel based on the procedural texture and compute a second radiance of the pixel based on the procedural reduction map and compute a final radiance based on a linear interpolation of the first and the second radiance.

12. A system for anti-aliasing a procedural texture comprising:
- means for creating a procedural reduction map describing the procedural texture as applied to an object, the procedural reduction map comprising a plurality of basis functions and a hierarchy of texels, and each texel comprising a plurality of basis weights and a surface normal distribution, and each of the basis weights corresponds to one of the basis functions;
- means for analyzing reflectance at each of a plurality of sample points on the object to produce the plurality of basis functions of the procedural reduction map;
- means for determining the plurality of basis weights and the surface normal distribution for each of a portion of the texels on a base level of the hierarchy;
- means for aggregating the basis weights and the surface normal distribution of the texels on the base level of the hierarchy to produce the basis weights and the surface normal distribution of the texels on the remaining levels of the hierarchy; and means for querying the procedural reduction map for a radiance of a pixel in the object.

13. The system of claim 12, further comprising:

means for finding a matching texel $T_f$, with a sample reflectance function that is in closest proximity to one of the plurality of basis functions $B_f$;

means for determining a point $P_i$ on the object corresponding to the matching texel;

means for determining a surface normal $n_i$ at the point $P_i$; and means for storing the procedural texture, the surface normal $n_i$, and the point $P_i$, as the basis function $B_f$.

14. The system of claim 12, further comprising:

means for receiving a texture coordinate centered on the pixel and a texture footprint $A_f$ for texel associated with the pixel;

means for computing a minimal sampling area $A_M$ for the texel associated with the pixel;

means for computing a base-level texel area $A_i$ for the texel associated with the pixel;

means for, if the texture footprint $A_f$ is less than the minimal sampling area $A_M$, computing the radiance of the pixel based on the procedural texture;

means for, if the texture footprint $A_f$ is greater than or equal to the minimal sampling area $A_M$ and the texture footprint $A_f$ is greater than or equal to the base-level texel area $A_i$, computing the radiance of the pixel based on the procedural reduction map; and means for, if the texture footprint $A_f$ is greater than or equal to the minimal sampling area $A_M$ and the texture footprint $A_f$ is less than the base-level texel area $A_i$, computing a first radiance of the pixel based on the procedural texture and computing a second radiance of the pixel based on the procedural reduction map and computing a final radiance based on a linear interpolation of the first and the second radiance.

* * * * *